United States Patent [19]
Komatsuda et al.

[11] Patent Number: 5,493,857
[45] Date of Patent: Feb. 27, 1996

[54] EXHAUST GAS-PURIFYING SYSTEM FOR INTERNAL COMBUSTION ENGINES

[75] Inventors: Takashi Komatsuda; Hiroaki Kato; Yuichi Shimasaki; Akihisa Saito; Toshikazu Oketani; Takuya Aoki, all of Wako, Japan

[73] Assignee: Honda Giken Kogyo Kabushiki Kaisha, Tokyo, Japan

[21] Appl. No.: 393,903

[22] Filed: Feb. 24, 1995

[30] Foreign Application Priority Data

Mar. 2, 1994 [JP] Japan ................................ 6-056777

[51] Int. Cl.⁶ .................................................. F01N 3/18
[52] U.S. Cl. ............................... 60/284; 60/289; 60/312; 60/324
[58] Field of Search ............................. 60/284, 289, 312, 60/324

[56] References Cited

U.S. PATENT DOCUMENTS

| | | | |
|---|---|---|---|
| 5,014,817 | 5/1991 | Takato et al. | 60/312 |
| 5,293,741 | 3/1994 | Kashiyama et al. | 60/284 |
| 5,355,673 | 10/1994 | Sterling et al. | 60/324 |
| 5,372,109 | 12/1994 | Thompson et al. | 60/324 |
| 5,388,402 | 2/1995 | Aoki et al. | 60/289 |
| 5,390,488 | 2/1995 | Ament et al. | 60/284 |

FOREIGN PATENT DOCUMENTS

4-105925  9/1992  Japan.

*Primary Examiner*—Ira S. Lazarus
*Assistant Examiner*—L. Heyman
*Attorney, Agent, or Firm*—Nikaido, Marmelstein, Murray & Oram

[57] ABSTRACT

An exhaust gas-purging system for an internal combustion engine includes a catalyst arranged in an exhaust passage of the engine, for purifying exhaust gases emitted from the engine. The system detects an engine operating condition and a catalyst temperature parameter indicative of the temperature of the catalyst. The supply of secondary air to the exhaust passage and the flow path cross-sectional area of the exhaust passage are controlled based on at least one of the operating condition of the engine and the catalyst temperature parameter.

15 Claims, 8 Drawing Sheets

EXHAUST GAS-PURIFYING SYSTEM FOR INTERNAL COMBUSTION ENGINES

BACKGROUND OF THE INVENTION

1. Field of the Invention

The present invention relates to an exhaust gas-purifying system for internal combustion engines, which has at least one catalyst arranged in an exhaust passage of the engine, for purifying exhaust gases from the engine.

2. Prior Art

An exhaust gas-purifying system for internal combustion engines has been proposed by Japanese Provisional Utility Model Publication (Kokai) No. 4-105925, which includes a heater-equipped catalyst arranged in an exhaust passage of the engine, which operates to heat the catalyst for acceleration of activation thereof when the engine is started in a cold condition.

However, in the conventional system it takes a fairly long time to heat the catalyst to an activation temperature at or above which it is activated, by the heater alone. To shorten the required heating time period for prompt activation of the catalyst, a heater having a large capacity is required, which, however, necessitates the use of a battery having an increased size for supplying electric power to the heater, resulting in an increased cost, etc.

SUMMARY OF THE INVENTION

It is an object of the invention to provide an exhaust gas-purifying system for internal combustion engines, which is capable of promptly activating a catalyst provided in an exhaust passage of the engine when the engine is started in a cold condition, thereby attaining excellent exhaust emission characteristics of the engine.

To attain the above object, the present invention provides an exhaust gas-purifying system for an internal combustion engine having an exhaust passage, comprising:

catalyst means arranged in the exhaust passage, for purifying exhaust gases emitted from the engine;

secondary air supply means for supplying a secondary air into the exhaust passage at a location upstream of the catalyst means;

flow path cross-sectional area-changing means arranged in the exhaust passage at a location downstream of the catalyst, for changing a flow path cross-sectional area of the exhaust passage;

engine operating condition-detecting means for detecting operating conditions of the engine;

catalyst temperature parameter-detecting means for detecting a catalyst temperature parameter indicative of a temperature of the catalyst means; and control means for controlling operation of the secondary air supply means and operation of the flow path cross-sectional area-changing means, based on at least one of the engine operating conditions detected by the engine operating condition-detecting means and the catalyst temperature parameter detected by the catalyst temperature parameter-detecting means.

Preferably, the control means causes the secondary air supply means to supply the secondary air and the flow path cross-sectional area-changing means to reduce the flow path cross-sectional area of the exhaust passage, when the at least one of the detected operating conditions of the engine and the detected catalyst temperature parameter indicates the catalyst means is in an inactive state.

More preferably, the engine operating condition-detecting means includes engine temperature sensor means for detecting a temperature of the engine, and the control means causes the secondary air supply means to supply the secondary air and the flow path cross-sectional area-changing means to reduce the flow path cross-sectional area of the exhaust passage, when the temperature of the engine detected by the engine temperature sensor means is below a predetermined value.

More preferably, the engine operating condition-detecting means includes timer means for detecting time elapsed after the engine is started, and the control means causes the secondary air supply means to supply the secondary air and the flow path cross-sectional area-changing means to reduce the flow path cross-sectional area of the exhaust passage, when the time detected by the timer means is within a predetermined time period.

More preferably, the catalyst temperature-detecting means includes catalyst temperature sensor means for detecting a temperature of the catalyst means, and the control means causes the secondary air supply means to supply the secondary air and the flow path cross-sectional area-changing means to reduce the flow path cross-sectional area of the exhaust passage, when the temperature of the catalyst detected by the catalyst temperature sensor means is below a predetermined value.

Preferably, the engine operating condition-detecting means includes engine load-detecting means for detecting load on the engine, and the control means causes the flow path cross-sectional area-changing means to control the flow path cross-sectional area of the exhaust passage, based on the load detected by the engine load-detecting means.

More preferably, the control means inhibits the flow path cross-sectional area-changing means from reducing the flow path cross-sectional area of the exhaust passage, when the load detected by the engine load-detecting means is above a predetermined value.

Preferably, the exhaust gas-purifying system includes heater means for electrically heating the catalyst.

More preferably, the control means controls operation of the secondary air supply means, operation of the flow path cross-sectional area-changing means, and operation of the heater means, based on at least one of the engine operating conditions detected by the engine operating condition-detecting means and the catalyst temperature parameter detected by the catalyst temperature parameter-detecting means.

More preferably, the catalyst temperature-detecting means includes catalyst temperature sensor means for detecting a temperature of the catalyst, and the control means controls the operation of the secondary air supply means, the operation of the flow path cross-sectional area-changing means, and the operation of the heater means, according to a time period during which the temperature of the catalyst means detected by the catalyst temperature sensor means is below a predetermined value.

Further preferably, the catalyst means includes a first catalyst having the heater means provided therein, and a second catalyst arranged downstream of the first catalyst.

Still more preferably, the control means causes the secondary air supply means to supply the secondary air, the flow path cross-sectional area-changing means to reduce the flow path cross-sectional area of the exhaust passage, and the heater means to operate, over a first predetermined time period, when the temperature of the catalyst means detected by the catalyst temperature sensor means is below a first predetermined value, while the control means inhibits the heater means from operating, and causes the secondary air supply means to continue the supply of the secondary air and the flow path cross-sectional area-changing means to continue the reduction of the flow path cross-sectional area of the exhaust passage, when a time period during which the temperature of the catalyst means detected by the catalyst temperature sensor means is above the first predetermined value, but below s second predetermined value is within a second predetermined time period.

Further preferably, the catalyst temperature sensor means includes a catalyst temperature sensor mounted in the first catalyst for detecting a temperature of the first catalyst.

Further preferably, the catalyst temperature sensor means includes a catalyst temperature sensor mounted in the second catalyst for detecting a temperature of the second catalyst.

Further preferably, the catalyst temperature sensor means includes a first catalyst temperature sensor mounted in the first catalyst for detecting a temperature of the first catalyst, and a second catalyst temperature sensor mounted in the second catalyst for detecting a temperature of the second catalyst.

The above and other objects, features, and advantages of the invention will become more apparent from the following detailed description taken in conjunction with the accompanying drawings.

DETAILED DESCRIPTION

The invention will now be described with reference to drawings showing embodiments thereof.

Figure 1:
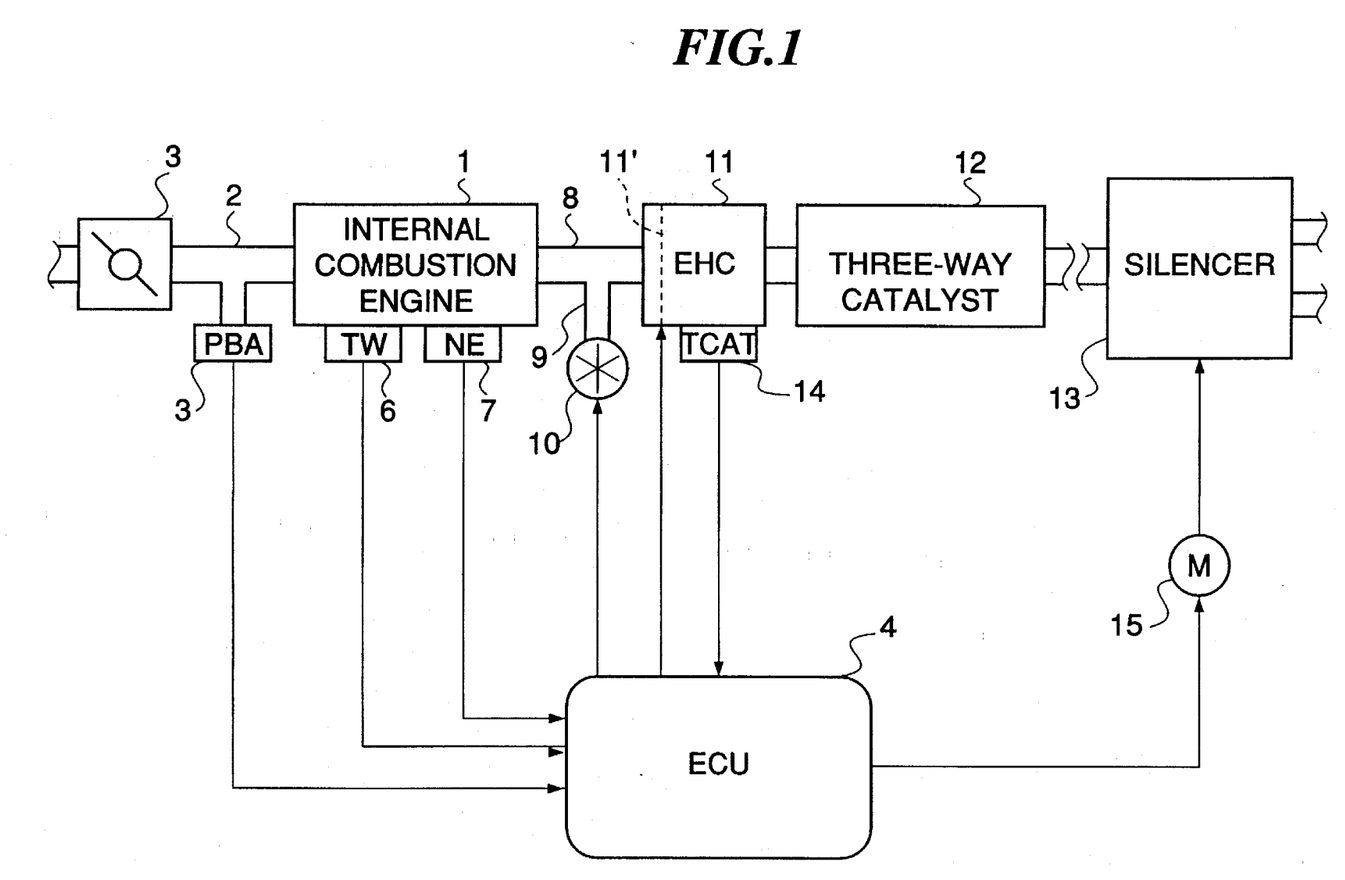
FIG. 1 is a block diagram showing the arrangement of an internal combustion engine and an exhaust gas-purifying system according to an embodiment of the invention incorporated therein.

FIG. 1 schematically shows an internal combustion engine (hereinafter simply referred to as "the engine") and an exhaust gas-purifying system incorporated therein. In the figure, reference numeral 1 designates the internal combustion engine which has an exhaust passage 2 having a throttle valve 3 arranged therein.

An intake pipe absolute pressure (PBA) sensor 4 is arranged immediately downstream of the throttle valve 3, for supplying an electric signal indicative of the sensed absolute pressure to an electronic control unit (hereinafter referred to as "the ECU") 4.

An engine coolant temperature (TW) sensor 6 formed of a thermistor or the like is inserted into a coolant passage filled with a coolant and formed in the cylinder block, for supplying an electric signal indicative of the sensed engine coolant temperature TW to the ECU 5.

An engine rotational speed (NE) sensor 7 is arranged in facing relation to a camshaft or a crankshaft of the engine 1, neither of which is shown. The engine rotational speed sensor 7 generates a signal pulse (hereinafter referred to as "the TDC signal pulse") at a predetermined crank angle position whenever the crankshaft of the engine 1 rotates through 180 degrees, the signal pulse being supplied to the ECU 4.

Arranged in an exhaust passage 8 of the engine 1 in the upstream-to-downstream order are a heater-equipped catalyst (hereinafter referred to as "the EHC") 11 which can be electrically heated, a three-way catalyst 12, which is larger in capacity than the EHC 11, for purifying noxious components HC, CO, NOx, etc. contained in exhaust gases emitted from the engine, and a silencer 13 having a labyrinthine internal configuration for providing muffling effects with a valve 16 (see FIG. 2A) for increasing and decreasing the sectional area of an exhaust gas flow path formed by the exhaust passage 8. Further, an air pump 10 is connected to the exhaust passage 8 at a location upstream of the EHC 11 via a passage 9, the operation of which is controlled by the ECU 4. The air pump 10 operates to supply fresh air into the exhaust passage 8 via the passage 9.

The EHC 11 has a heater 11' electrically connected to the ECU 4. The ON/OFF operation (energization/deenergization) of the heater is controlled by the ECU 4. The heater 11' of the EHC 11 is formed by a catalyst carrier which in itself is formed of an electric resistor and generates heat through energization thereof. Alternatively, the heater may be provided separately from the catalyst carrier. Further, the EHC 11 has a catalyst temperature sensor 14 inserted therein for detecting the temperature (catalyst temperature) TCAT of the catalyst and a signal indicative of the sensed catalyst temperature TCAT is supplied to the ECU 4.

Figure 2A:
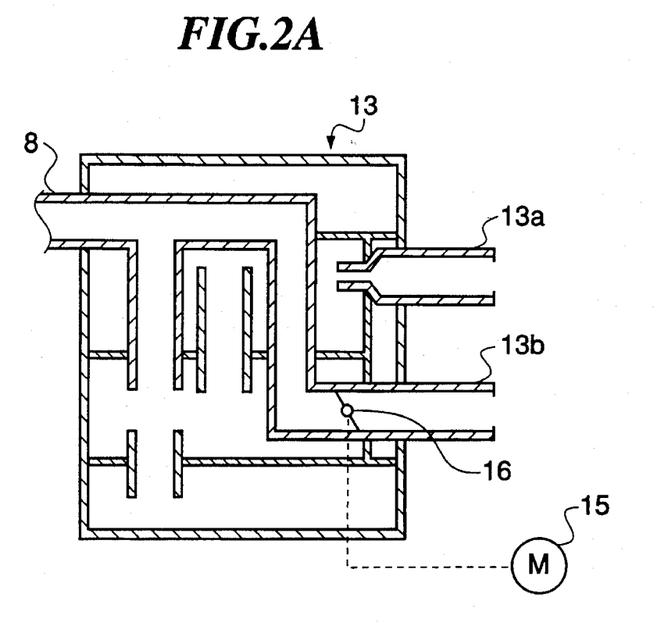
FIG. 2A is a sectional view showing the configuration of a silencer appearing in FIG. 1.

Further, as shown in FIG. 2A, the valve 16 of the silencer 13 is mechanically connected to a stepping motor 15 to be driven thereby. The stepping motor 15 is electrically connected to the ECU 4 to have its operation controlled by a signal therefrom, for controlling the opening of the valve 16.

The silencer 14 has a labyrinthine internal configuration as shown in FIG. 2A to produce muffling effects, and has two outlet ports 13a, 13b provided at downstream ends of a flow path formed therethrough. One 13a of the outlet ports has the aforementioned valve 16 arranged therein for changing the cross-sectional area of the flow path. The valve 16, which may be formed by a butterfly valve or a rotary valve, is mechanically connected to the stepping motor 15 to have its valve opening controlled to a desired angle between an open position for opening the outlet port 13a and a closed position for closing the same. Therefore, by changing the opening of the valve 16, the cross-sectional area of the exhaust passage 8 is increased or decreased to vary the flow resistance of the exhaust passage 8 against exhaust gases.

Figure 2B:
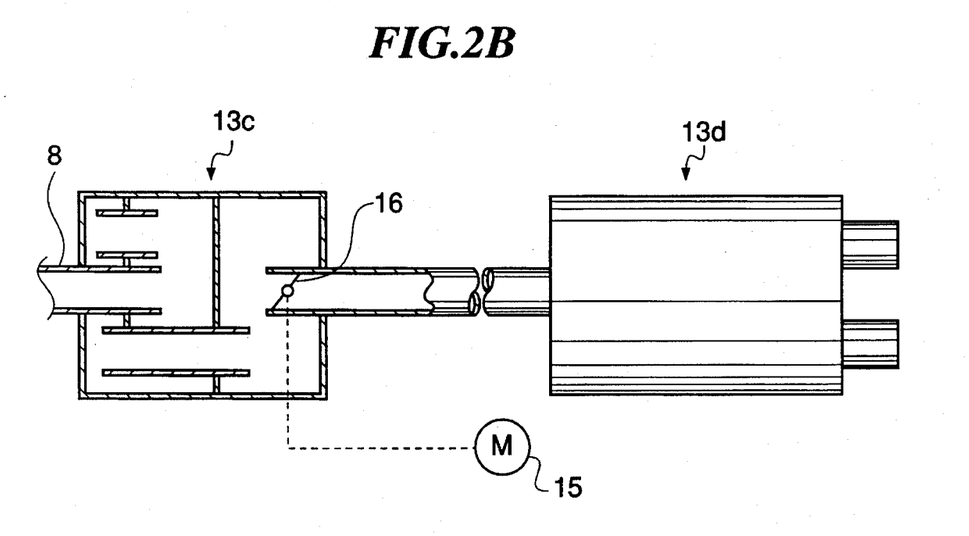
FIG. 2B is a view, partly in section, showing a variation of the FIG. 2A silencer.

In a variation of the present embodiment, the silencer 13 may be constructed as shown in FIG. 2B such that there are separately provided a block 13c having the valve 16 arranged therein for control of the cross-sectional area of the exhaust passage 8, and a block 13d having a muffling function.

The ECU 4 is comprised of an input circuit having the functions of shaping the waveforms of input signals from various sensors including the temperature sensors 3 and 4 mentioned above, shifting the voltage levels of sensor output signals to a predetermined level, converting analog signals from analog-output sensors to digital signals, and so forth, a central processing unit (hereinafter referred to as the "the CPU"), memory means storing various operational programs which are executed by the CPU, and for storing results of calculations therefrom, etc., and an output circuit which outputs driving signals to the heater of the EHC 11, the air pump 10, the stepping motor 15, etc.

Figure 3:
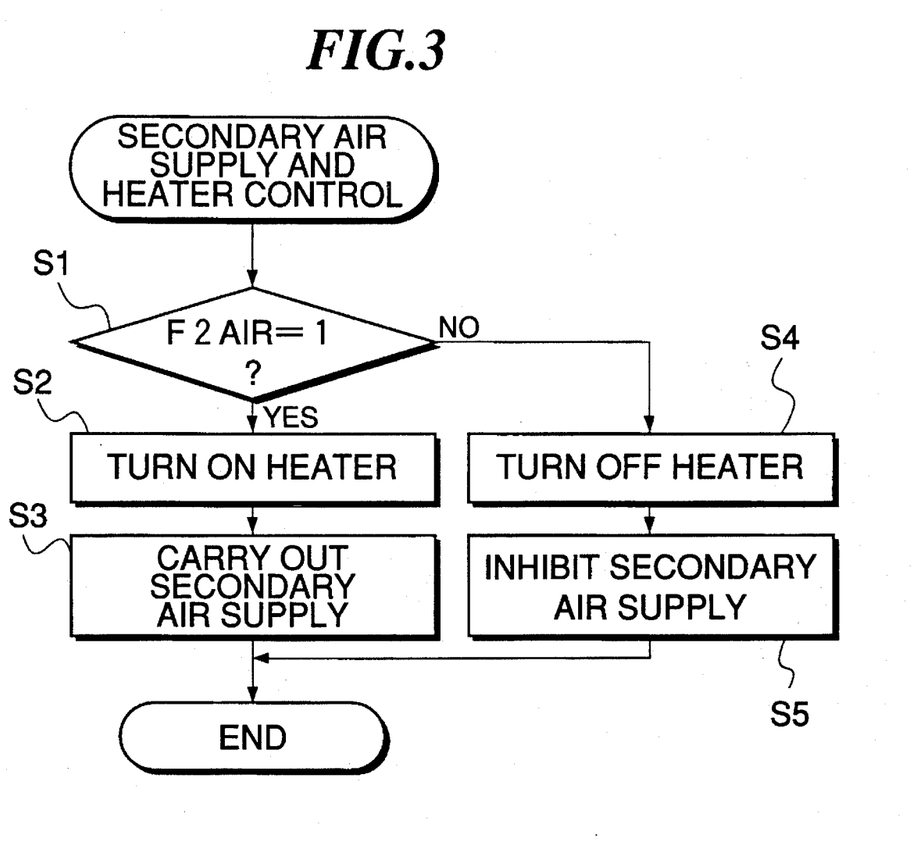
FIG. 3 is a flowchart of a program for controlling the supply of a secondary air and the operation of a heater of a heater-equipped catalyst appearing in FIG. 1.

FIG. 3 shows a program for controlling the secondary air supply and the operation of the heater 11' of the EHC 11, which is executed by the ECU 4 e.g. at regular time intervals immediately after the start of the engine.

At a step S1, it is determined whether or not a flag F2AIR is set to 1 for indicating the fulfillment of conditions for supplying the secondary air. If F2AIR=1, i.e. if the conditions are fulfilled, the heater of the EHC 11 is turned on (energized) at a step S2, and at the same time the supply of secondary air is started at a step S3. On the other hand, if F2AIR=0, the heater of the EHC 11 is turned off (deenergized) at a step S4, and at the same time the supply of the secondary air is inhibited at a step S5.

Figure 4:
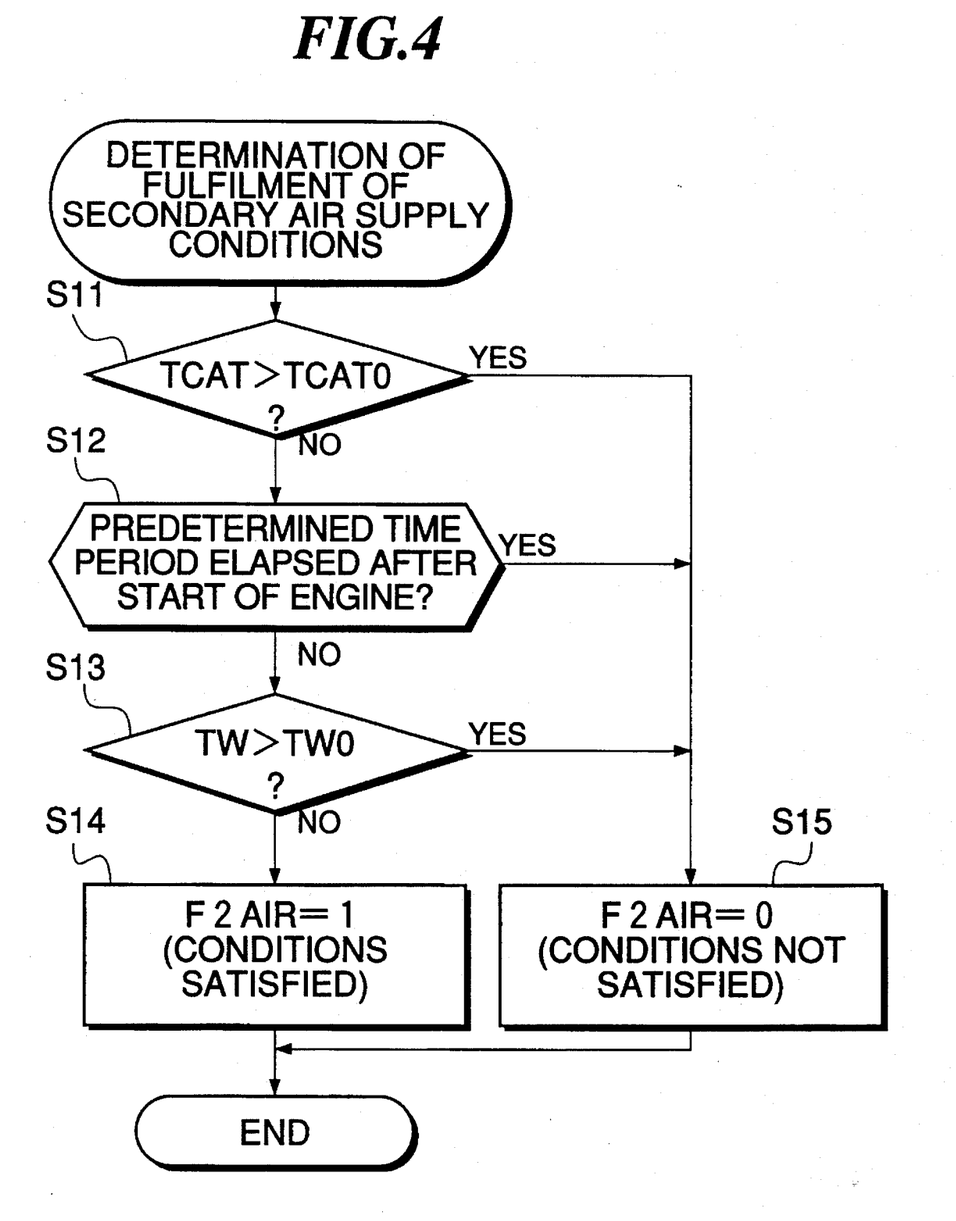
FIG. 4 is a flowchart of a program for determining whether or not conditions for the supply of a secondary are satisfied.

FIG. 4 shows a program for determining whether or not the conditions for supplying the secondary air are fulfilled, i.e. a program for setting the flag F2AIR.

At a step S11, it is determined whether or not the catalyst temperature TCAT is higher than a predetermined value TCAT0 (e.g. 400° C.). If TCAT≦TCAT0 holds, it is determined at a step S12 whether or not a predetermined time period (e.g. 60 seconds) has elapsed after the start of the engine 1. If the answer to this question is negative (NO), the program proceeds to a step S13 where it is determined whether or not the engine coolant temperature TW is higher than a predetermined value TW0 (e.g. 80° C.).

If all the answers to the questions of the steps S11 to S13 are negative (NO), i.e. when the predetermined time period has not elapsed after the start of the engine, and TCAT<TCAT0 and TW<TW0 holds, it is judged that the EHC 11 and the three-way catalyst 12 are not activated and the engine is in a condition requiring the supply of secondary air, and the flag F2AIR is set to "1" at a step S14.

On the other hand, if any of the answers to the questions of the steps S11 to S13 is affirmative (YES), i.e. if TCAT>TCAT0 or TW>TW0, or before the predetermined time period has elapsed after the start of the engine, it is judged that the engine is in a condition in which the supply of the secondary air is not necessary, and the flag F2AIR is set to "0", at a step S15.

As will be easily understood from FIG. 3, the conditions for the secondary air supply are the same as those for energizing the heater of the EHC 11.

Figure 5:
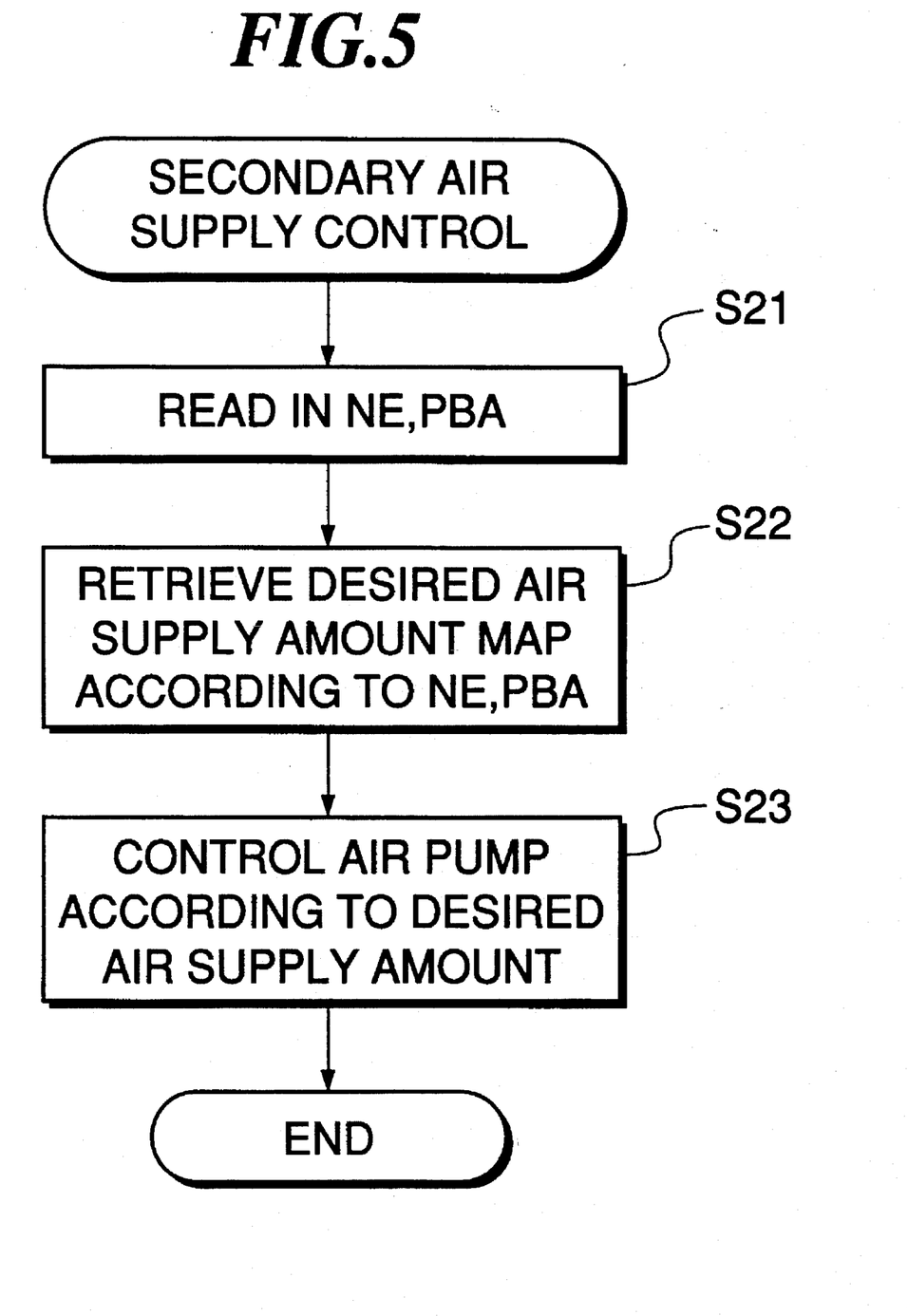
FIG. 5 is a flowchart of a program for carrying out secondary air supply control.

FIG. 5 shows a program for controlling the secondary air supply, which is executed at the step S3 of FIG. 3 e.g. at regular time intervals.

At a step S21, the engine rotational speed NE and the intake pipe absolute pressure PBA are read in, and then a desired air supply amount map is retrieved at a step S22 according to the engine rotational speed NE and the intake pipe absolute pressure PBA to determine a desired air supply amount. The desired air supply amount map is set such that map values of the desired air supply amount, i.e. desired values of the secondary air supply amount are provided correspondingly to predetermined values of the engine rotational speed NE and predetermined values of the intake pipe absolute pressure PBA.

Then, at a step S23, a desired rotational speed of the air pump 10 is determined according to the desired air supply amount determined at the step S22 whereby the air pump 10 is controlled such that the actual rotational speed thereof becomes equal to the desired value.

Figure 6:
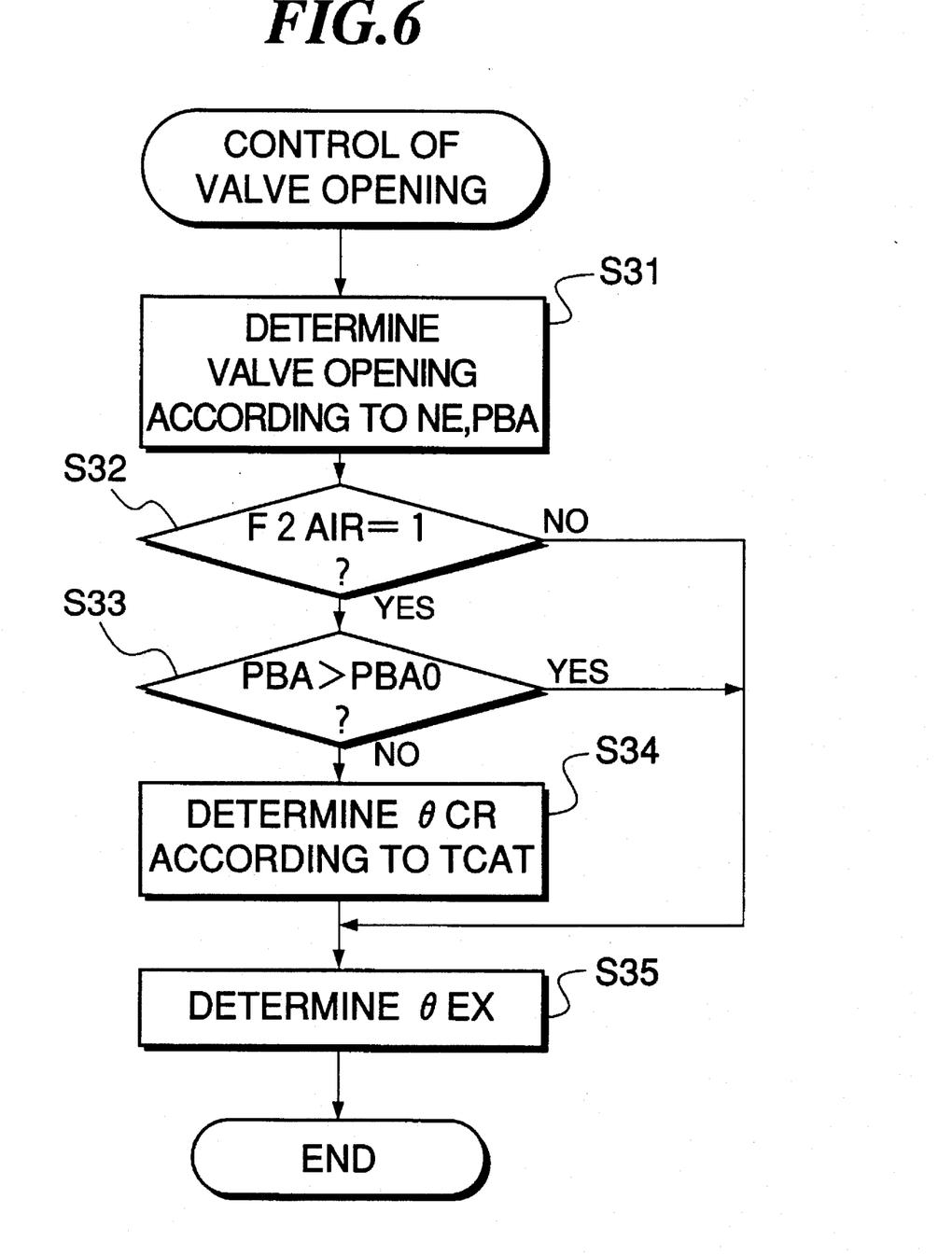
FIG. 6 is a flowchart of a program for controlling the opening of a valve appearing in FIG. 2A and FIG. 2B.

FIG. 6 shows a program for controlling the opening of the valve 16, which is executed by the ECU 4.

At a step S31, a map value θEXMAP of the valve 16 is read from a map according to the engine rotational speed NE and the intake pipe absolute pressure PBA. Then, it is determined at a step S32 whether or not the flag F2AIR for indicating the fulfillment of the conditions for the secondary air supply is equal to 1. If F2AIR=0 holds, i.e. if the conditions are not fulfilled, the program proceeds to a step S35, where the map value θEXMAP is set to a final control value θEX of the opening of the valve.

If the answer to the question of the step S32 is affirmative (YES), i.e. if F2AIR=1 holds, the program proceeds to a step S33, where it is determined whether or not the intake pipe absolute pressure PBA is higher than a predetermined value PBA0 (e.g. 60 Kpa (450 mmHg)). If PBA>PBA0 holds, which means that the engine is operating in a high load condition, the program proceeds to the step S35, whereas if PBA≦PBA0 holds, a correction amount θCR for correcting the opening of the valve 16 in a valve-closing direction is determined according to the catalyst temperature TCAT.

Figure 7:
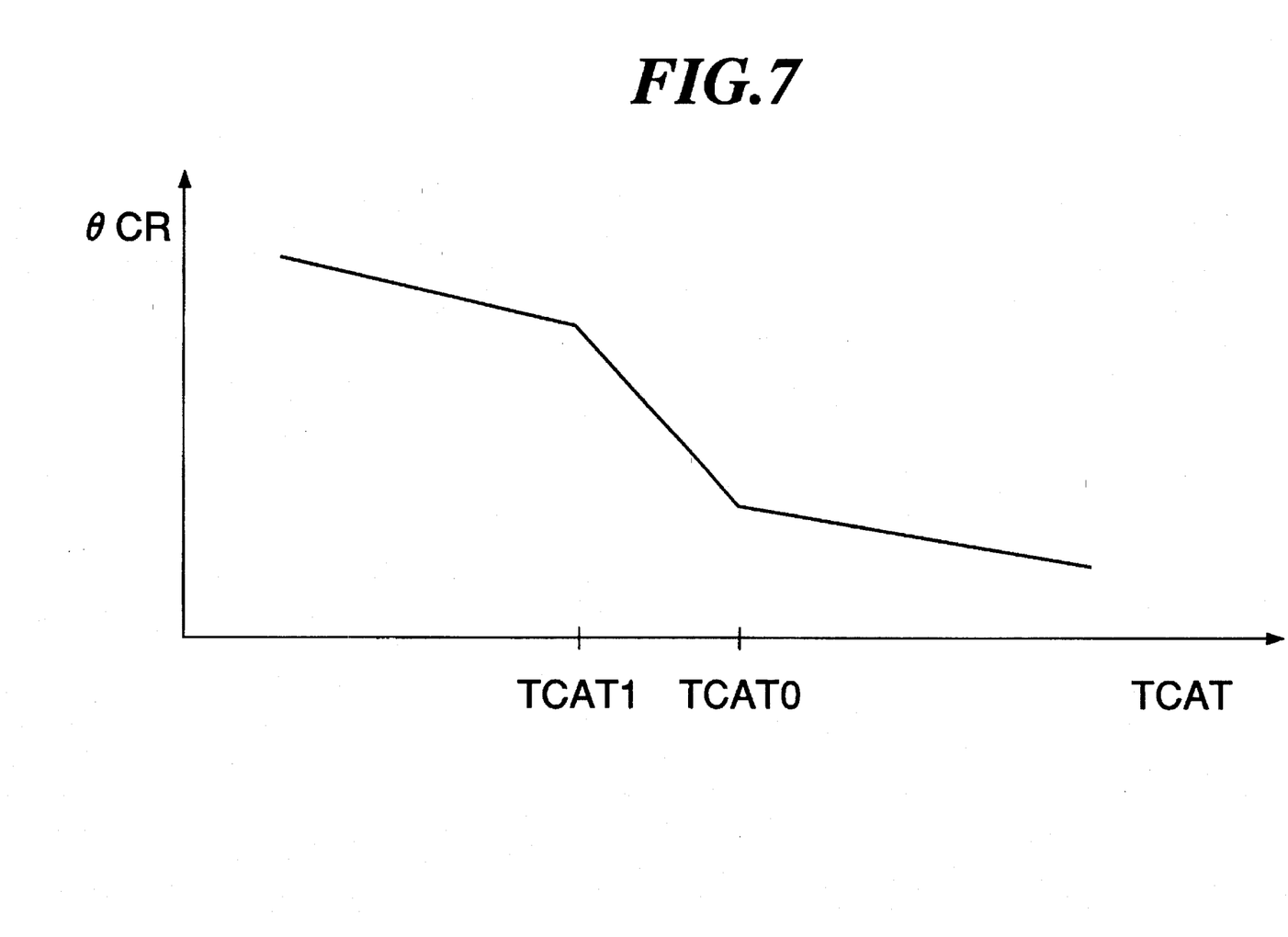
FIG. 7 shows a table for determining a correction amount (θCR) for the opening of the valve, based on a catalyst temperature (TCAT)

The correction amount θCR is determined by retrieving a θCR table which is set such that a table value of the correction amount θCR decreases with increase in the catalyst temperature TCAT, as shown in FIG. 7. In FIG. 7, TCAT1 and TCAT2 indicate predetermined catalyst temperature values (e.g. TCAT1 is set to 250° C., while TCAT2 to 350° C.).

Then, the program proceeds to the step S35, wherein the final control value θEX is calculated by the use of the following equation:

$$\theta EX = \theta EXMAP - \theta CR$$

Thus, the final control value θEX is obtained by correcting the map value θEXMAP in the valve-closing direction by the correction amount θCR.

In addition, when the engine is in the high load condition in which PBA>PBA0 holds, the step S34 is skipped over, since the correction of the valve opening in the valve-closing direction would decrease the output of the engine and hence degrade the driveability under such a high load condition.

According to the present embodiment, when the engine coolant temperature TW is low (TW<TW0) and at the same time the temperature TCAT of the EHC 11 is low (TCAT<TCAT0), i.e. not high enough to make the EHC 11 active, the secondary air supply conditions are satisfied provided that it is before the lapse of the predetermined time period after the start of the engine (at the steps S11 to S14 in FIG. 4), so that the opening control value θEX for the valve 16 in the exhaust passage is corrected in the valve-closing direction (at the steps S34 and S35 in FIG. 6), to decrease the cross-sectional area of the exhaust passage and hence increase the flow resistance thereof so that the back pressure increases, resulting in an increase in the temperature of the combustion chamber of the engine 1, thereby increasing the temperature of the exhaust gases. Since the secondary air is supplied at the same time (at the step S3 in FIG. 3), the oxidation reaction of unburnt fuel components contained in the exhaust gases is accelerated, which causes prompt activation of the EHC 11 and the three-way catalyst 12. As a result, the exhaust emission characteristics of the engine immediately after the start of the engine can be improved.

Further, since electric current is supplied to the heater 11' of the EHC 11 (at the step S2 in FIG. 3), the catalyst can be activated at the higher rate.

Figure 8:
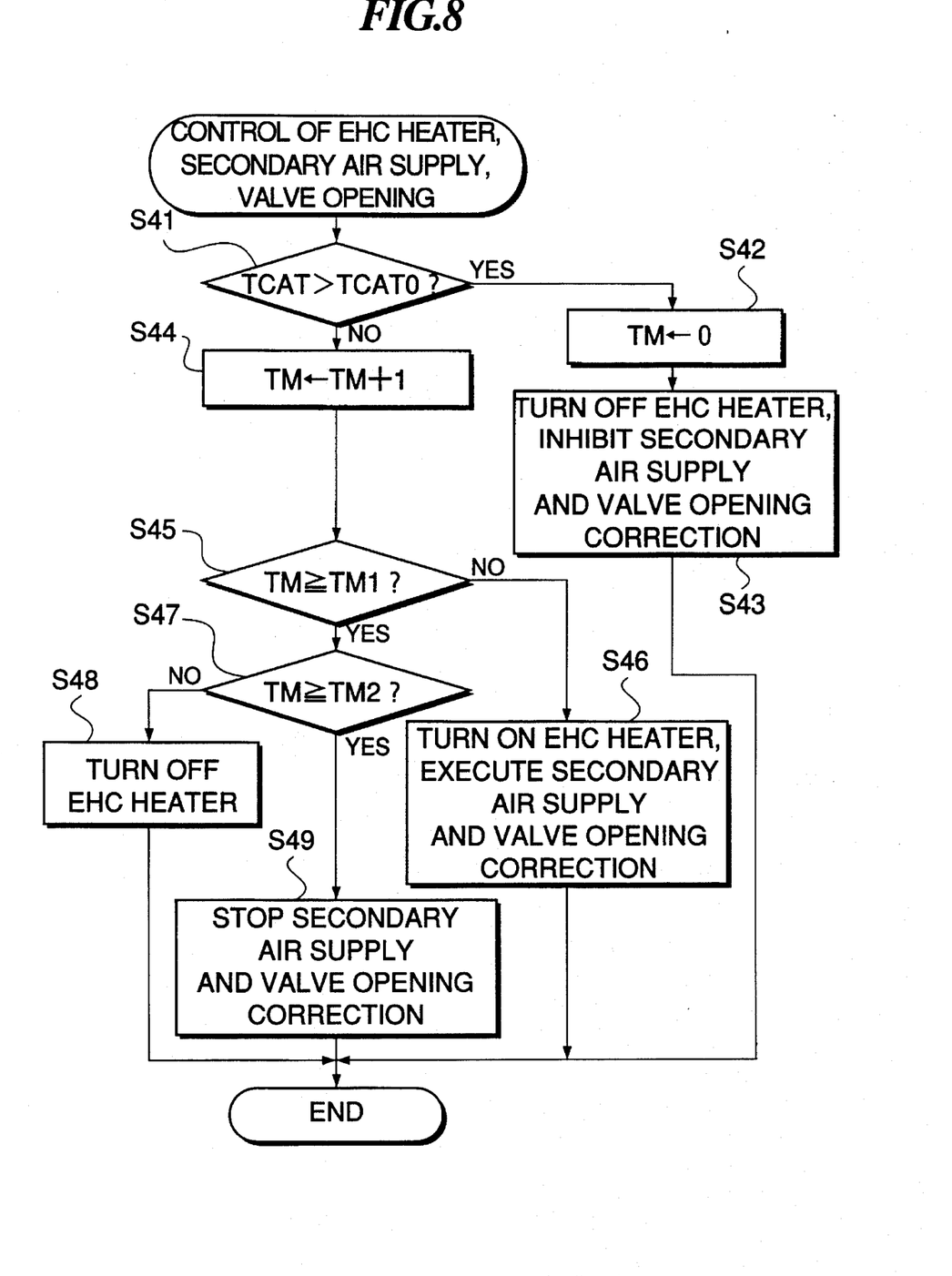
FIG. 8 is a flowchart of a program for controlling the secondary air supply, the operation of the heater, and the opening of the valve, according to another embodiment of the invention.

FIG. 8 shows a program for controlling the operation of the heater of the EHC 11, the supply of the secondary air, and the opening of the valve 16, which is executed by an exhaust gas-purifying system according to another embodiment of the invention at regular time intervals immediately after the start of the engine.

At a step S41, it is determined whether or not the catalyst temperature TCAT is higher than a predetermined value TCAT0 (e.g. 400° C.). If TCAT>TCAT0 holds, the count TM of a timer is reset to "0" at a step S42, and the heater 11' of the EHC 11 is turned off while inhibiting the supply of the secondary air and correction of the valve opening of the valve 16 (by the correction amount θCR) at a step S43.

On the other hand, if the answer to the question of the step S41 is negative, i.e. if TCAT≦TCAT0 holds, the count TM of the timer is incremented at a step S44, and it is determined at a step S45 whether or not the count TM is equal to or higher than a first predetermined value TM1 (e.g. corresponding to 20 seconds). In the first loop of execution of this step, TM<TM1 holds, and then the program proceeds to a step S46, where the heater of the EHC 11 is turned on, while carrying out the supply of the secondary air-fuel ratio and correction of the valve opening of the valve, for prompt activation of the EHC 11 and the three-way catalyst 12.

If TM≧TM1 holds subsequently, it is determined at a step S47 whether or not the count TM of the timer is equal to or higher than a second predetermined value TM2 (e.g. corresponding to 40 seconds). In the first loop of execution of this step, TM<TM2 holds, and then the program proceeds to a step S48, where the heater of the EHC is turned off, whereas the secondary air supply and the valve opening correction alone are continued. This is based on the following ground: over a time period during which TM1<TM<TM2 holds, the EHC 11 (the EHC 11 and a light-off catalyst 12 when the light-off catalyst is provided between the EHC 11 and the three-way catalyst 12) is activated, but the three-way catalyst 12 is not yet activated. Therefore, when TM1<TM<TM2 holds, by continuing the secondary air supply and the valve opening correction, the activation of the three-way catalyst is accelerated. On this occasion, operation of the EHC 11 (and the light-off catalyst) after activation is sufficient as a heat source for acceleration of the activation of the catalyst 12, and hence the power consumption can be saved by turning off the heater 11'.

When TM≧TM2 holds subsequently, both the secondary air supply and the valve opening correction are stopped at a step S49. Thereafter, the opening of the valve 16 is controlled such that it is the optimum for output characteristics of the engine and muffling effects of the silencer 13, in a manner, similar to the steps S31 to S33, and S35 in FIG. 6.

The secondary air supply control and the valve opening correction are carried out in manners similar to the program of FIG. 5 and the step S34 in FIG. 6, respectively.

According to the present embodiment, as described above, the operation of the EHC heater and the control of the secondary air supply are carried out in a manner more appropriate to conditions of activation of the catalysts, which makes it possible to reduce the power consumption by the EHC heater.

Although in the above described embodiment, the catalyst temperature sensor 14 is provided in the EHC 11, this is not limitative, but the sensor 14 may be provided in the three-way catalyst 12, whereby the temperature of the three-way catalyst 12 may be used as the catalyst temperature TCAT. Also alternatively, catalyst temperature sensors may be mounted in both the EHC 11 and the three-way catalyst 72, wherein the determinations of the step S11 in FIG. 4 and the step S41 in FIG. 8 may be carried out in the following manner:

More specifically, so long as the three-way catalyst TCAT is increasing, the temperature of the three-way catalyst 12 is used as the catalyst temperature TCAT to determine whether TCAT>TCAT0 holds, whereas when the catalyst temperature TCAT is decreasing, the temperature of the EHC 11 is used as the catalyst temperature TCAT to determine whether or not TCAT>TCAT0 holds. This is because the catalyst mass of the three-way catalyst 12 is larger than that of the EHC 11, and hence the thermal capacity of the latter is larger than that of the former.

Further, although it is determined at the step S13 in FIG. 4 whether or not the engine coolant temperature TW is higher than the predetermined value TW0, this is not limitative, but the intake air temperature TA may also be detected and determination as to whether the intake air temperature TA is higher than a predetermined value TA0 may be carried out, whereby it may be determined that the conditions for the secondary air supply are not fulfilled when both the temperatures TW and TA are above the predetermined values TW0, TWA, respectively.

Further, instead of detecting the catalyst temperature TCAT, a time period elapsed after the start of the engine and/or a cumulative value of the fuel injection period may be used as a parameter(s) indicative of the catalyst temperature, based on which the determination at the step S11 in FIG. 4 and determination of the correction amount θCR in the step S34 in FIG. 6 may be carried out.

What is claimed is:

1. An exhaust gas-purifying system for an internal combustion engine having an exhaust passage, comprising:

catalyst means arranged in said exhaust passage, for purifying exhaust gases emitted from said engine;

secondary air supply means for supplying a secondary air into said exhaust passage at a location upstream of said catalyst means;

flow path cross-sectional area-changing means arranged in said exhaust passage at a location downstream of said catalyst, for changing a flow path cross-sectional area of said exhaust passage;

engine operating condition-detecting means for detecting operating conditions of said engine;

catalyst temperature parameter-detecting means for detecting a catalyst temperature parameter indicative of a temperature of said catalyst means; and control means for controlling operation of said secondary air supply means and operation of said flow path cross-sectional area-changing means, based on at least one of said engine operating conditions detected by said engine operating condition-detecting means and said catalyst temperature parameter detected by said catalyst temperature parameter-detecting means.

2. An exhaust gas-purifying system according to claim 1, wherein said control means causes said secondary air supply means to supply said secondary air and said flow path cross-sectional area-changing means to reduce said flow path cross-sectional area of said exhaust passage, when said at least one of the detected operating conditions of said engine and the detected catalyst temperature parameter indicates said catalyst means is in an inactive state.

3. An exhaust gas-purifying system according to claim 2, wherein said engine operating condition-detecting means includes engine temperature sensor means for detecting a temperature of said engine, and wherein said control means causes said secondary air supply means to supply said secondary air and said flow path cross-sectional area-changing means to reduce said flow path cross-sectional area of said exhaust passage, when the temperature of said engine detected by said engine temperature sensor means is below a predetermined value.

4. An exhaust gas-purifying system according to claim 2, wherein said engine operating condition-detecting means includes timer means for detecting time elapsed after said engine is started, and wherein said control means causes said secondary air supply means to supply said secondary air and said flow path cross-sectional area-changing means to reduce said flow path cross-sectional area of said exhaust passage, when said time detected by said timer means is within a predetermined time period.

5. An exhaust gas-purifying system according to claim 2, wherein said catalyst temperature-detecting means includes catalyst temperature sensor means for detecting a temperature of said catalyst means, and wherein said control means causes said secondary air supply means to supply said secondary air and said flow path cross-sectional area-changing means to reduce said flow path cross-sectional area of said exhaust passage, when the temperature of said catalyst detected by said catalyst temperature sensor means is below a predetermined value.

6. An exhaust gas-purifying system according to claim 1, wherein said engine operating condition-detecting means includes engine load-detecting means for detecting load on said engine, and wherein said control means causes said flow path cross-sectional area-changing means to control said flow path cross-sectional area of said exhaust passage, based on said load detected by said engine load-detecting means.

7. An exhaust gas-purifying system according to claim 6, wherein said control means inhibits said flow path cross-sectional area-changing means from reducing said flow path cross-sectional area of said exhaust passage, when said load detected by said engine load-detecting means is above a predetermined value.

8. An exhaust gas-purifying system according to claim 1, including heater means for electrically heating said catalyst.

9. An exhaust gas-purifying system according to claim 8, wherein said control means controls operation of said secondary air supply means, operation of said flow path cross-sectional area-changing means, and operation of said heater means, based on at least one of said engine operating conditions detected by said engine operating condition-detecting means and said catalyst temperature parameter detected by said catalyst temperature parameter-detecting means.

10. An exhaust gas-purifying system according to claim 8, wherein said catalyst temperature-detecting means includes catalyst temperature sensor means for detecting a temperature of said catalyst, and wherein said control means controls said operation of said secondary air supply means, said operation of said flow path cross-sectional area-changing means, and said operation of said heater means, according to a time period during which the temperature of said catalyst means detected by said catalyst temperature sensor means is below a predetermined value.

11. An exhaust gas-purifying system according to claim 10, wherein said catalyst means includes a first catalyst having said heater means provided therein, and a second catalyst arranged downstream of said first catalyst.

12. An exhaust gas-purifying system according to claim 11, wherein said control means causes said secondary air supply means to supply said secondary air, said flow path cross-sectional area-changing means to reduce said flow path cross-sectional area of said exhaust passage, and said heater means to operate, over a first predetermined time period, when the temperature of said catalyst means detected by said catalyst temperature sensor means is below a first predetermined value, while said control means inhibits said heater means from operating, and causes said secondary air supply means to continue the supply of said secondary air and said flow path cross-sectional area-changing means to continue the reduction of said flow path cross-sectional area of said exhaust passage, when a time period during which the temperature of said catalyst means detected by said catalyst temperature sensor means is above said first predetermined value, but below s second predetermined value is within a second predetermined time period.

13. An exhaust gas-purifying system according to claim 11, wherein said catalyst temperature sensor means includes a catalyst temperature sensor mounted in said first catalyst for detecting a temperature of said first catalyst.

14. An exhaust gas-purifying system according to claim 11, wherein said catalyst temperature sensor means includes a catalyst temperature sensor mounted in said second catalyst for detecting a temperature of said second catalyst.

15. An exhaust gas-purifying system according to claim 11, wherein said catalyst temperature sensor means includes a first catalyst temperature sensor mounted in said first catalyst for detecting a temperature of said first catalyst, and a second catalyst temperature sensor mounted in said second catalyst for detecting a temperature of said second catalyst.

* * * * *